United States Patent Office 3,091,027
Patented May 28, 1963

3,091,027
METHOD AND COMPOSITION FOR ASSEMBLING TOGETHER REFRACTORY BODIES
Jacques Clair, Grenoble, France, assignor to Pechiney, Compagnie de Produits Chimiques et Electrometallurgiques, Paris, France, a corporation
No Drawing. Filed Nov. 19, 1959, Ser. No. 854,000
Claims priority, application France Nov. 20, 1958
5 Claims. (Cl. 29—472.7)

In certain manufacturing operations, there are used special refractories for constructing furnaces to be subjected to very high temperatures of the order of 2000° C., occasionally, under vacuum. Such refractories must, in addition, possess high resistance to chemical attack under those conditions. Carbides, nitrides, or borides of metals of high melting point, such as tungsten, molybdenum, tantalum, titanium, zirconium, can frequently be used as linings of such furnaces.

However, the refractory parts thus constituted must be joined together in order to produce larger parts, furnace walls or roofs which are strong and tight.

The present invention, which is based upon applicant's researches, has for its object a process for joining and assembling refractory parts. It also comprehends, as a novel industrial product, a special paste (cement) used for this purpose.

To assemble together refractory parts of carbides, nitrides and borides of high melting point metals, there is used, according to the present invention, a paste comprising as a first ingredient a powder constituted of a mixture—in approximately stoichiometric proportions—of one or more metals such as titanium, zirconium, tungsten, molybdenum, tantalum, etc., and of metalloids such as carbon and/or boron, or else, of the combination of one or more of such metals with one or more of said metalloids.

The second ingredient of the paste is a plastic binder which is liquid at ordinary temperatures, there being used a sufficient quantity of the binder to give to the paste the plasticity of cement mortar normally used in masonry.

In a preferred embodiment of the invention, there is used a resin having a polyester base and possessing a low viscosity at ordinary temperatures, and containing a sufficient quantity of a catalyst so that the setting of the paste in the cold state takes place quickly and, preferably, in about one hour.

The bricks, preliminary machined if necessary, are coated with this paste on those sides which are to be in contact and are placed in position in the same manner as in ordinary refractory masonry.

It is not necessary that the powder ingredient of the paste be the same as that of the bricks to be pointed (joined).

The following example, which is not given by way of limitation, will enable a better understanding of the invention.

EXAMPLE

*Assembly of Bricks of Molybdenum Carbide*

There is prepared a fluid mortar by mixing in the cold the following ingredients:

|  | Gr. |
|---|---|
| Molybdenum passing a 200 mesh screen | 2000 |
| Petroleum coke passing a 200 mesh screen | 125 |
| Polyester resin | 1000 |
| Catalyst (methyl ethyl ketone hydroperoxide) | 50 |

The polyester resin used above is composed of:

| 100 parts polyester | viscosity (Baumé): 4.5 poises at 25° C. |
|---|---|
| 60 parts styrene | |
| 1/10,000 part hydroquinone (based on the total weight) | |
| 4/100,000 part cobalt in state of cobalt naphtenate (based on the total weight) | |

The polyester was prepared from:

| | Mol. |
|---|---|
| Maleic anhydride | 0.38 |
| Phthalic anhydride | 0.62 |
| Propylene glycol | 1 |

Before the bricks are placed in position, the surfaces thereof to be joined are coated with this fluid mortar by means of a trowel.

The mortar sets in about one hour. The temperature is then raised at the rate of 50° per hour until a temperature of 500° C. is reached to enable the progressive elimination of the plastic binder; then the temperature is quickly raised to 1900° C., which temperature is maintained for six hours, whereby the metal-metalloid mixture is sintered.

The resistance to rupture and the tightness of such a joint are excellent.

The fluid mortar having a molybdenum and coke base can be successfully used, not only for bricks or parts of molybdenum carbide, but also for bricks or parts of titanium carbide, titanium boride and all other bricks or parts of a similar nature.

It is possible to use, as plastic binder, any plastic material having substantially the same viscosity at 25° C. as that one set forth in the example.

The following substances may be used, for instance, as catalysts: products consisting substantially of cobalt salts and hydroperoxides, such as cyclohexanone hydroperoxide, etc., and products consisting substantially of amines and peroxide of diaryl or diacyl, such as benzoyl peroxide, lauryl peroxide, dimethyl-aniline, etc.

I claim:
1. A process of assembling together refractory bodies of the class consisting of carbides, nitrides and borides of high melting point metals, consisting in the following steps: mixing together a powdered metal selected from the class consisting of titanium, zirconium, tungsten, molybdenum and tantalum, and a metalloid selected from the class consisting of carbon and boron, said metal and metalloid being mixed in substantially stoichiometric proportions for formation of the respective metal-metalloid compound; adding thereto an organic plastic binder which is liquid at ordinary temperatures selected from the group consisting of those that solidify by heating and in the cold by catalytic action, and which binder is capable of elimination by heating to a temperature of approximately 500° C., there being used a sufficient quantity of said binder so that the resultant paste has the plasticity of cement mortar used in masonry; coating the surfaces of the bodies to be assembled with this paste; assembling said bodies together; and thereafter heating the assembled parts to approximately 1900° C. to sinter the metal-metalloid mixture and thereby join said bodies together.

2. Process according to claim 1 wherein the plastic binder comprises a low viscosity thermosetting polyester resin and a catalyst for accelerating the setting of the paste at ordinary temperatures.

3. Process according to claim 1 wherein the heating step comprises gradually raising the temperature to about 500° C. to enable progressive elimination of said binder and then raising the temperature rapidly to about 1900° C. until sintering of the metal-metalloid mixture has occurred.

4. A novel heat-sintering paste for use in assembling together refractory bodies subjected to high temperatures comprising a mixture of a powdered metal selected from the class consisting of titanium, zirconium, tungsten, molybdenum and tantalum, and a metalloid selected from the class consisting of carbon and boron, said metal and metalloid being present in substantially stoichiometric proportions for formation of the respective metal-metalloid compound, and an organic plastic binder which is liquid at ordinary temperatures selected from the group consisting of those that solidify by heating and in the cold by catalytic action, and which binder is capable of elimination by heating to a temperature of approximately 500° C., there being used a sufficient quantity of said binder so that the resultant paste has the plasticity of cement mortar used in masonry.

5. A novel heat-sintering paste in accordance with claim 4 wherein the powdered metal is molybdenum, the metalloid is carbon, and the binder is thermosetting polyester resin of low viscosity at ordinary temperatures and a catalyst for accelerating the setting of the paste at ordinary temperatures.

References Cited in the file of this patent

UNITED STATES PATENTS

| | | |
|---|---|---|
| 1,919,730 | Koening et al. | July 25, 1933 |
| 2,385,380 | Ratchford et al. | Sept. 25, 1945 |
| 2,461,878 | Christensen et al. | Feb. 15, 1949 |
| 2,523,625 | Jones | Sept. 26, 1950 |
| 2,593,943 | Wainer | Apr. 22, 1952 |
| 2,652,621 | Nelson | Sept. 22, 1953 |
| 2,725,287 | Cronin | Nov. 29, 1955 |
| 2,744,011 | Samuel et al. | May 1, 1956 |
| 2,791,025 | Ballhausen et al. | May 7, 1957 |
| 2,828,225 | Guenter et al. | Mar. 25, 1958 |
| 2,833,030 | Peaslee | May 6, 1958 |
| 2,887,461 | Hort | May 19, 1959 |
| 2,908,072 | Johnson | Oct. 13, 1959 |
| 2,968,551 | North et al. | Jan. 17, 1961 |
| 2,974,404 | Humenik | Mar. 14, 1961 |
| 2,996,793 | Jayne | Aug. 22, 1961 |

FOREIGN PATENTS

| | | |
|---|---|---|
| 487,263 | Great Britain | June 17, 1938 |
| 820,569 | Great Britain | Sept. 23, 1959 |

OTHER REFERENCES

Barron, "Modern Plastics," second ed., Chapman & Hall, 1949 (page 1 relied on).